United States Patent
Oikawa

(10) Patent No.: US 10,495,873 B2
(45) Date of Patent: Dec. 3, 2019

(54) ELECTRONIC DEVICE AND ELECTRO-OPTICAL DEVICE HAVING A MIRROR WITH ANTIREFLECTION FILM

(71) Applicant: SEIKO EPSON CORPORATION, Tokyo (JP)

(72) Inventor: Hiroyuki Oikawa, Sakata (JP)

(73) Assignee: SEIKO EPSON CORPORATION, Tokyo (JP)

( * ) Notice: Subject to any disclaimer, the term of this patent is extended or adjusted under 35 U.S.C. 154(b) by 89 days.

(21) Appl. No.: 15/613,727

(22) Filed: Jun. 5, 2017

(65) Prior Publication Data
US 2018/0004063 A1   Jan. 4, 2018

(30) Foreign Application Priority Data

Jun. 29, 2016   (JP) .................................. 2016-128515

(51) Int. Cl.
*G02B 26/08*   (2006.01)
*G02F 1/31*   (2006.01)

(52) U.S. Cl.
CPC ..... *G02B 26/0833* (2013.01); *G02B 26/0841* (2013.01); *G02F 1/31* (2013.01); *G02F 2201/38* (2013.01)

(58) Field of Classification Search
CPC .......................... G02B 26/0833; G02B 26/0841
USPC ........................ 359/318, 212.1, 223.1, 226.2
See application file for complete search history.

(56) References Cited

U.S. PATENT DOCUMENTS

| 6,618,186 | B2 * | 9/2003 | Kaeriyama | G02B 26/0841 359/291 |
| 6,844,959 | B2 * | 1/2005 | Huibers | G02B 26/0841 345/109 |
| 6,891,655 | B2 * | 5/2005 | Grebinski | B81B 7/0012 359/290 |
| 7,268,929 | B2 * | 9/2007 | Asai | G02B 26/0833 359/212.1 |
| 7,751,113 | B2 * | 7/2010 | Huibers | G02B 26/0841 359/223.1 |
| 8,153,353 | B2 * | 4/2012 | Neidrich | G02B 26/0833 430/319 |
| 2010/0283923 | A1 | 11/2010 | Kawakami | |

(Continued)

FOREIGN PATENT DOCUMENTS

| JP | 05276317 A | * 10/1993 |
| JP | 2010-250005 A | 11/2010 |
| JP | 2010-262200 A | 11/2010 |

*Primary Examiner* — Zachary W Wilkes
(74) *Attorney, Agent, or Firm* — Oliff PLC

(57) ABSTRACT

An electronic device includes an electro-optical device including a substrate, a mirror for optical modulation disposed above one surface side of the substrate, and electrodes including an elevated address electrode disposed between the mirror and the substrate. The light source emits light toward the mirror in a direction at an angle with respect to the direction perpendicular to the mirror. The mirror includes a first incident end face which is an end face of the mirror located at a side from which the light is radiated, and a first antireflection film is provided on the first incident end face. The elevated address electrode includes a second incident end face which is an end face of the elevated address electrode located at the side from which the light is radiated, and a second antireflection film is provided on the second incident end face.

9 Claims, 9 Drawing Sheets

(56) References Cited

U.S. PATENT DOCUMENTS

2015/0070749 A1     3/2015    McDonald et al.
2016/0266377 A1     9/2016    McDonald et al.

* cited by examiner

ELECTRONIC DEVICE AND ELECTRO-OPTICAL DEVICE HAVING A MIRROR WITH ANTIREFLECTION FILM

BACKGROUND

1. Technical Field

The present invention relates to an electronic device and an electro-optical device that modulate light with a mirror.

2. Related Art

Examples of electronic devices including mirrors that have been proposed include a display device that modulates light emitted from a light source with an electro-optical device called a digital micromirror device (DMD) and then magnifies and projects the modulated light with a projection optical system. The electro-optical device included in this electronic device includes a substrate, light modulating mirrors disposed above one surface side of the substrate, and electrodes disposed between the substrate and the mirrors. The light source radiates light toward each mirror in a direction oblique to the direction perpendicular to the mirror. An electrostatic force generated between the mirror and the corresponding electrode is used to switch the position of the mirror to an ON position, in which the mirror reflects the light in an ON direction toward the projection optical system, or an OFF position, in which the mirror reflects the light in an OFF direction that differs from the ON direction. Accordingly, the light is modulated (see US2015/0070749 A1).

In the electro-optical device and the electronic device described in US2015/0070749 A1, when the light is reflected by an end face of a mirror located at the side from which the light is radiated, the reflected light serves as stray light, which may be projected by the projection optical system and degrade the quality of the projected image. In particular, when the mirror is in the OFF position, an end portion of the mirror at the side from which the light is radiated is raised high above the substrate. Therefore, light reflected by the end face of the mirror easily serves as stray light that is incident on an adjacent mirror.

SUMMARY

An advantage of some aspects of the invention is that the invention provides an electronic device and an electro-optical device capable of suppressing the generation of stray light due to unnecessary reflection of the light.

An electronic device according to an aspect of the invention includes an electro-optical device including a substrate, a mirror for optical modulation, and an electrode. The mirror is disposed above one surface side of the substrate. The electrode is disposed between the mirror and the substrate. The electrode generates an electrostatic force between the mirror and the electrode so as to rotate the mirror. The light source radiates a light toward the mirror in an oblique direction with respect to a normal direction of the mirror. The mirror includes a first incident end face which is an end face of the mirror located at a side from which the light is radiated, and a first antireflection film is provided on the first incident end face.

An electro-optical device according to another aspect of the invention includes a substrate, a mirror for optical modulation, and an electrode. The mirror is disposed above one surface side of the substrate. The electrode is disposed between the mirror and the substrate. The electrode generates an electrostatic force between the mirror and the electrode so as to rotate the mirror. The mirror includes a first incident end face which is an end face of the mirror located in one direction along the mirror, and a first antireflection film is provided on the first incident end face.

According to the invention, when the light source radiates the light toward the mirror of the electro-optical device in the oblique direction, the mirror is rotated by the electrostatic force generated between the mirror and the electrode, so that the position of the mirror can be switched to an ON position, in which the light is reflected in a predetermined ON direction, or an OFF position, in which the light is reflected in an OFF direction that differs from the ON direction. Accordingly, the light can be modulated by controlling the position of each of a plurality of the mirrors. Here, the first antireflection film is provided on the end face of the mirror at the side from which the light is radiated (first incident end face). Therefore, reflection of the light at the first incident end face is suppressed by the first antireflection film. As a result, generation of stray light due to unnecessary reflection of the light can be suppressed.

In the electronic device, the mirror may include a protruding portion that protrudes toward the substrate, the protruding portion may include a hole that opens in a surface of the mirror, the hole may include an inner wall, and the first antireflection film may be provided on a part of the inner wall that faces the side from which the light is radiated. In the electro-optical device, preferably, the mirror includes a protruding portion that protrudes toward the substrate, the protruding portion includes a hole that opens in a surface of the mirror, the hole includes an inner wall, and the first antireflection film is provided on a part of the inner wall that faces the one direction. With these structures, reflection of the light at the opening edge of the hole can be suppressed. Therefore, generation of stray light due to unnecessary reflection of the light can be suppressed.

In the electronic device, preferably, the electrode includes a second incident end face which is an end face of the electrode located at the side from which the light is radiated, and a second antireflection film is provided on the second incident end face. In the electro-optical device, preferably, the electrode includes a second incident end face which is an end face of the electrode located in the one direction, and a second antireflection film is provided on the second incident end face. With these structures, reflection of the light at the end face of the electrode located at the side from which the light is radiated (second incident end face) is suppressed. Therefore, generation of stray light due to unnecessary reflection of the light can be suppressed.

In the electronic device and the electro-optical device, the first antireflection film may be a dielectric multilayer film. This structure is advantageous in that a temperature increase due to absorption of light is smaller than that in the case where the first antireflection film is an optical absorption film.

In the electronic device and the electro-optical device, the first antireflection film and the second antireflection film may be dielectric multilayer films. This structure is advantageous in that a temperature increase due to absorption of light is smaller than that in the case where the first antireflection film and the second antireflection film are optical absorption films.

In the case where the electronic device is used as a projection device, the electronic device includes a projection optical system that projects a reflected light that is reflected by the mirror.

In the electronic device and the electro-optical device, each of two end faces of the mirror that are adjacent to each other with a corner of the mirror disposed therebetween may be the first incident end face.

In the electronic device and the electro-optical device, only the first incident end face may be an end face toward which the light is radiated.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
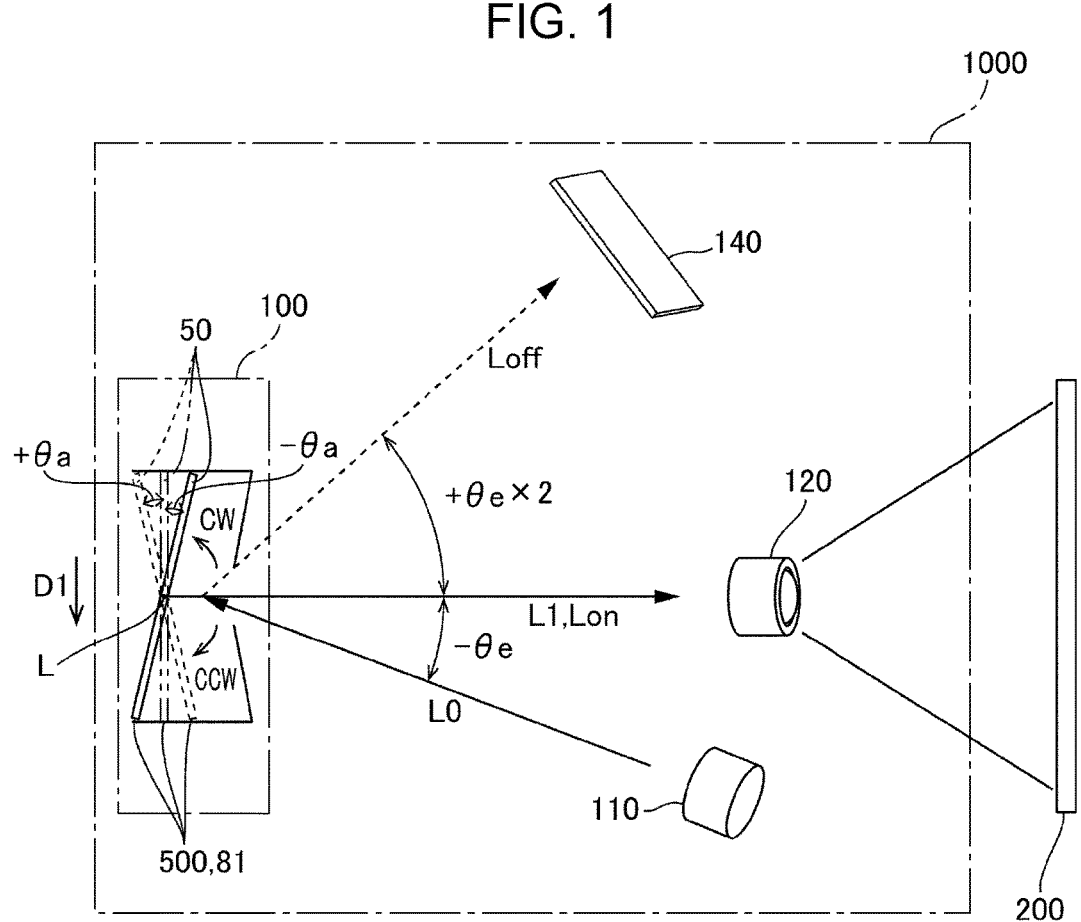
FIG. 1 illustrates an electronic device to which the invention is applied.

Embodiments of the invention will be described with reference to the drawings. In the drawings referred to below, layers and components are drawn in different scales so that each of the layers and components is discernible in the drawings. Although only a certain number of mirrors are shown in the drawings so that the mirrors are large enough to be discernible, a larger number of mirrors may be provided.

Overall Structure of Electronic Device 1000

FIG. 1 illustrates an electronic device 1000 to which the invention is applied. FIG. 1 illustrates only one of a plurality of mirrors 50 included in an electro-optical device 100. In FIG. 1, a steady position of the mirror 50 is shown by the two-dot chain lines, an ON position of the mirror 50 is shown by the solid lines, and an OFF position of the mirror 50 is shown by the dotted lines.

The electronic device 1000 illustrated in FIG. 1 includes a light source 110 and the electro-optical device 100, which modulates light emitted from the light source 110 in accordance with image information. The electronic device 1000 also includes a projection optical system 120 that projects the light modulated by the electro-optical device 100 onto an object 200, such as a wall surface or a screen, as a projection image. Thus, the electronic device 1000 is structured as a projection display device. The light source 110 successively emits red light, green light, and blue light. The electro-optical device 100 successively optically modulates the red light, the green light, and the blue light and emits the modulated light toward the projection optical system 120. Accordingly, a color image can be displayed.

The light source 110 may be configured to emit white light from a light source element toward the electro-optical device 100 through a color filter. The light source 110 may instead be configured to successively emit red light, green light, and blue light by successively turning on a light emitting element that emits red light, a light emitting element that emits green light, and a light emitting element that emits blue light. In either case, the electro-optical device 100 modulates the incident light in accordance with the timing at which the light source 110 emits red light, green light, and blue light.

Basic Structure of Electro-Optical Device 100

Figure 2:
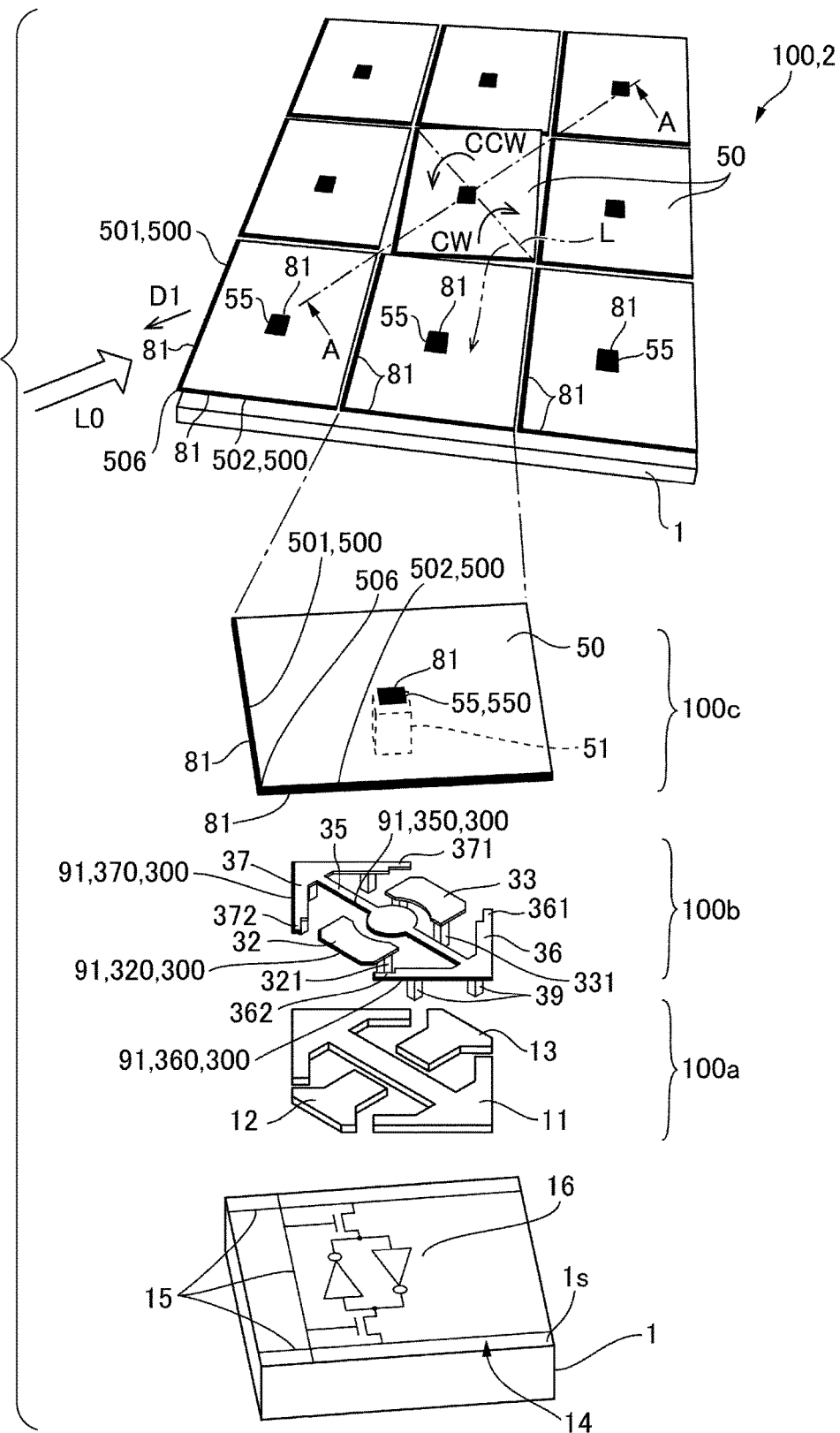
FIG. 2 is a schematic diagram illustrating an example of the basic structure of an electro-optical device illustrated in FIG. 1.
Figure 3:
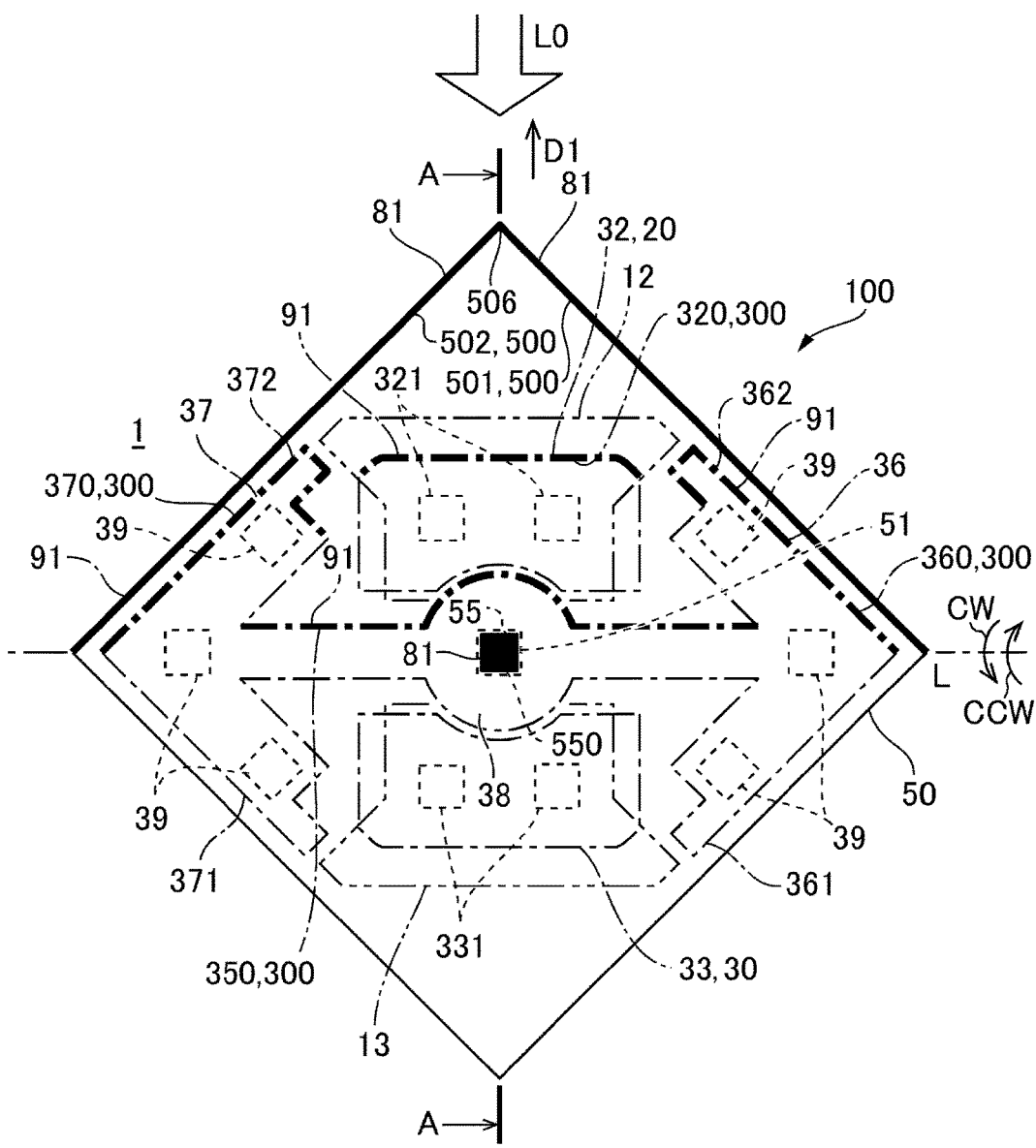
FIG. 3 is a schematic diagram illustrating the planar structure of the electro-optical device illustrated in FIG. 1.
Figure 4:
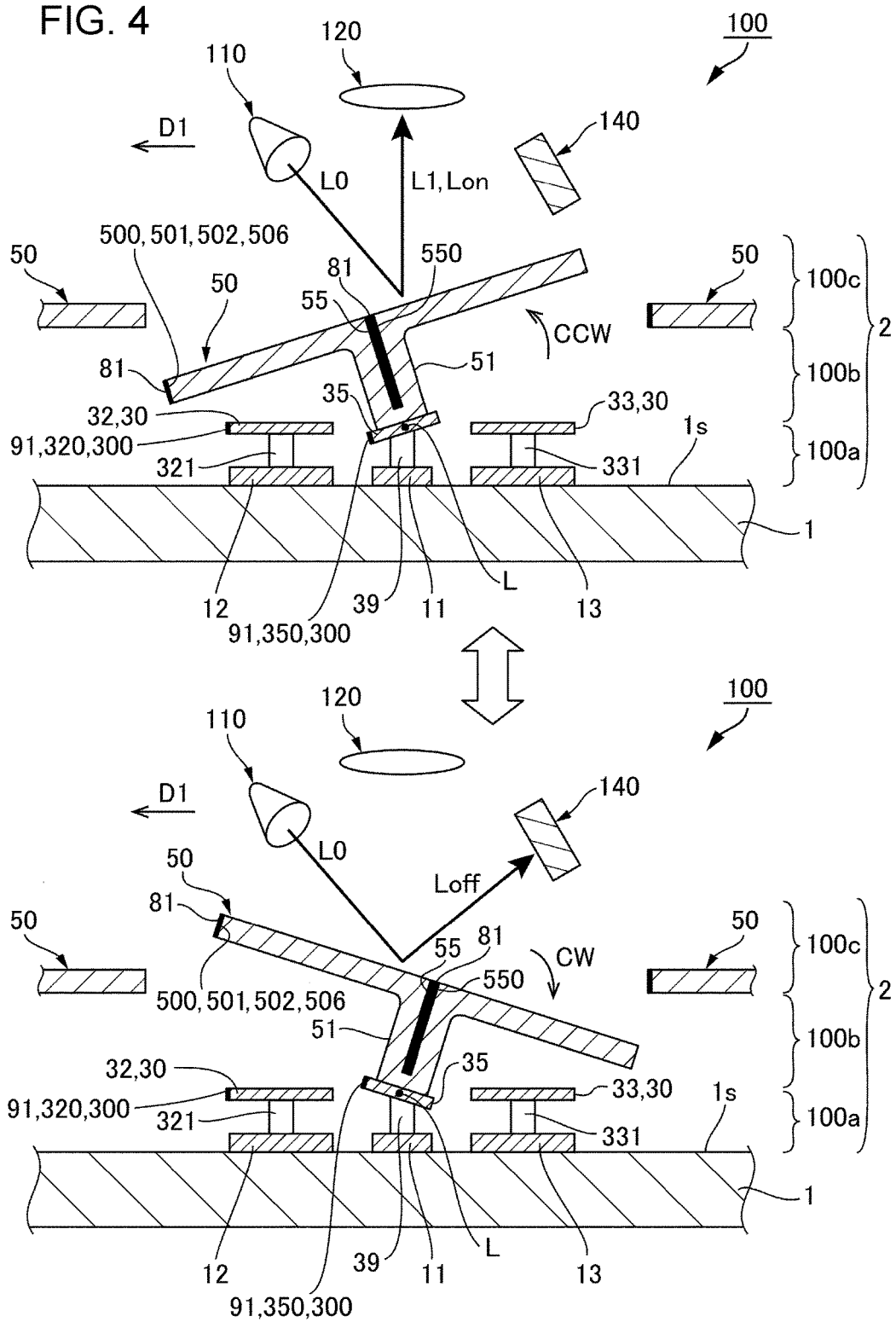
FIG. 4 shows schematic cross-sectional views of a section around a mirror in the electro-optical device illustrated in FIG. 1.

FIG. 2 is a schematic diagram illustrating an example of the basic structure of the electro-optical device 100 illustrated in FIG. 1. FIG. 2 shows an exploded view of a portion of the electro-optical device 100. FIG. 3 is a schematic diagram illustrating the planar structure of the electro-optical device 100 illustrated in FIG. 1. FIG. 3 illustrates only one mirror 50. FIG. 4 shows schematic cross-sectional views of a section around one of the mirrors 50 in the electro-optical device 100 illustrated in FIG. 1 taken along line A-A in FIGS. 2 and 3. FIG. 4 illustrates an ON position in which the mirror 50 is tilted around an axis L in one direction CCW, and an OFF position in which the mirror 50 is tilted around the axis L in the other direction CW.

As illustrated in FIGS. 2, 3, and 4, the electro-optical device 100 includes a chip 2 including a substrate 1 and a plurality of light-modulating mirrors 50 arranged above one surface is of the substrate 1 in a matrix pattern. In the chip 2, the mirrors 50 are disposed above the surface is of the substrate 1. The substrate 1 is, for example, a silicon substrate. The mirrors 50 are made of reflective metal films made of aluminum or the like. The mirrors 50 have a thickness of 1 μm or less, for example, 0.3 μm. The mirrors 50 are micro-mirrors having a rectangular shape with sides of 10 to 30 μm in length in plan view. The mirrors 50 are arranged in an array of, for example, 800×600 to 1920× 1080, and each mirror 50 corresponds to one pixel of the projection image.

In the electro-optical device 100, the chip 2 includes a first-level portion 100a, a second-level portion 100b, and a third-level portion 100c including the mirrors 50. The first-level portion 100a includes a substrate bias electrode 11 and substrate address electrodes 12 and 13 formed on the surface is of the substrate 1 for each mirror 50. The second-level portion 100b includes elevated address electrodes 32 and 33 and a hinge 35 for each mirror 50. The first-level portion 100a also includes an address circuit 14 formed on the substrate 1. The address circuit 14 includes a memory cell for controlling the movement of the corresponding mirror 50 and wires 15 including a word line and a bit line, and has a circuit configuration similar to that of a random access memory (RAM) including a CMOS circuit 16.

The second-level portion 100b includes the elevated address electrodes 32 and 33, the hinge 35, and a mirror support post 51 for each mirror 50. The elevated address electrodes 32 and 33 are electrically connected to the substrate address electrodes 12 and 13 by electrode posts 321 and 331, and are supported by the substrate address electrodes 12 and 13. Hinge arms 36 and 37 extend from both ends of the hinge 35. The hinge arms 36 and 37 are electrically connected to the substrate bias electrode 11 by hinge posts 39, and are supported by the substrate bias electrode 11. The mirror 50 is electrically connected to the hinge 35 by the mirror support post 51, and is supported by the hinge 35. Thus, the mirror 50 is electrically connected to the substrate bias electrode 11 by the mirror support post 51, the hinge 35, the hinge arms 36 and 37, and the hinge posts 39, and receives a bias voltage from the substrate bias electrode 11. Stoppers 361, 362, 371, and 372 that come into contact with the mirror 50 to prevent the mirror 50 from coming into contact with the elevated address electrodes 32 and 33 when the mirror 50 is tilted are provided at the ends of the hinge arms 36 and 37.

As described above, in the electro-optical device 100, electrodes including the substrate bias electrode 11, the substrate address electrodes 12 and 13, and the elevated address electrodes 32 and 33 are disposed between each mirror 50 and the substrate 1. The hinge 35 and the hinge arms 36 and 37 are used as relay electrodes for the mirror 50. Therefore, the hinge 35 and the hinge arms 36 and 37 also serve as electrodes disposed between the substrate 1 and the mirror 50.

Structure of Driving Element 30

The elevated address electrodes 32 and 33 constitute a driving element 30 that tilts the hinge 50 by generating an electrostatic force between the mirror 50 and the elevated address electrodes 32 and 33 at both sides of the mirror 50. The substrate address electrodes 12 and 13 may also be configured to tilt the mirror 50 by generating an electrostatic force between the mirror 50 and the substrate address electrodes 12 and 13. In this case, the elevated address electrodes 32 and 33 and the substrate address electrodes 12 and 13 constitute the driving element 30. The hinge 35 is turned when a driving voltage is applied to the elevated address electrodes 32 and 33 so that the mirror 50 is tilted toward the elevated address electrode 32 or the elevated address electrode 33, as illustrated in FIG. 4. When the application of the driving voltage to the elevated address electrodes 32 and 33 is stopped and the attractive force applied to the mirror 50 is eliminated, the hinge 35 exerts force for returning the mirror 50 to the steady position in which the mirror 50 is parallel to the substrate 1.

Layout of Light Source 110 and Other Components

In the electro-optical device 100 having the above-described structure, the driving element 30 rotates the mirror 50 around the axis L, which extends parallel to the mirror 50 in the steady position along the hinge 35. When the mirror 50 is rotated around the axis L in one direction CCW to the ON position in which the mirror 50 is tilted toward the elevated address electrode 32, the mirror 50 reflects light L0 emitted from the light source 110 in an ON direction Lon toward the projection optical system 120.

When the mirror 50 is rotated around the axis L in the opposite direction CW to the OFF position in which the mirror 50 is tilted toward the other elevated address electrode 33, the mirror 50 reflects the light L0 emitted from the light source 110 in an OFF direction Loff that differs from the ON direction Lon. Accordingly, the mirror 50 in the OFF position does not reflect the light L0 toward the projection optical system 120. In the present embodiment, an optical absorption device 140 is located in the OFF direction Loff.

The projection optical system 120 is located in the direction perpendicular to the mirror 50 in the steady position (position shown by the two-dot chain lines in FIG. 1), and the ON direction Lon is the direction from the mirror 50 to the projection optical system 120.

The light source 110 radiates the light L0 toward the mirror 50 in an oblique direction at an angle of $-\theta e°$ with respect to the ON direction Lon (direction perpendicular to the mirror 50). Therefore, when the driving element 30 switches the mirror 50 from the steady position to the ON position (position shown by the solid lines in FIG. 1) in which the mirror 50 is at an angle of $-\theta a°$ with respect to the mirror 50 in the steady position, the mirror 50 reflects the light L0 in the ON direction Lon toward the projection optical system 120. The angles $\theta a$ and $\theta e$ satisfy the following equation:

$$\theta e = 2 \times \theta a$$

Here, $\theta a°$ is, for example, 12°. In this case, $\theta e°$ is 24°.

The optical absorption device 140 is located in a direction (OFF direction Loff) that is at an angle of $+(2\times\theta e°)$ with respect to the ON direction Lon. Therefore, when the driving element 30 switches the mirror 50 from the steady position to the OFF position (position shown by the dotted lines in FIG. 1) in which the mirror 50 is at an angle of $+\theta a°$ with respect to the mirror 50 in the steady position, the mirror 50 reflects the light L0 in the OFF direction Loff toward the optical absorption device 140.

Thus, the light L0 can be modulated by controlling the position of each of the mirrors 50 illustrated in FIG. 2, and the modulated light L1 can be projected onto the object 200 as image light by the projection optical system 120.

Structures of First Antireflection Film 81 and Second Antireflection Film 91

As illustrated in FIGS. 2, 3, and 4, each of the mirrors 50 included in the electro-optical device 100 of the present embodiment has a first antireflection film 81 provided on first incident end faces 500 thereof. The first incident end faces 500 are end faces of each mirror 50 located in one direction D1 along the mirror 50. The one direction D1 is the direction in which the light source 110 is located in the electronic device 1000. Therefore, the first incident end faces 500 are the end faces of the mirror 50 located at the side from which the light L0 is radiated, and the first antireflection film 81 is provided on these first incident end faces 500.

In the present embodiment, two end faces 501 and 502 that are adjacent to each other with a corner 506 of the mirror 50 disposed therebetween face the one direction D1, and these two end faces 501 and 502 are the first incident end faces 500. In other words, the two adjacent end faces 501 and 502 having the corner 506 of the mirror 50 disposed therebetween are the first incident end faces 500 located at the side from which the light L0 is radiated. The first antireflection film 81 is formed of a dielectric multilayer film, in which two types of layers having different refractive indices are alternately stacked, or an optical absorption film. In the present embodiment, the first antireflection film 81 is formed of a dielectric multilayer film.

In the electro-optical device 100 according to the present embodiment, a hole 55 opens in a surface of the mirror 55. The hole 55 is a recess formed in the mirror support post 51 when the mirror support post 51 is formed by a method described below with reference to FIGS. 5 to 8. In the present embodiment, the first antireflection film 81 is also formed on a part of an inner wall 550 of the hole 55 that faces the one direction D1. More specifically, the part of the inner wall 550 of the hole 55 that faces the side from which the light L0 is radiated has the first antireflection film 81 formed thereon. The hole 55 may either be structured so that only the part of the inner wall 550 that faces the side from which the light L0 is radiated has the first antireflection film 81 formed thereon, or be structured so that the hole 55 is filled with the first antireflection film 81. In the present embodiment, the hole 55 is filled with the first antireflection film 81.

In addition, in the electro-optical device 100 according to the present embodiment, among the electrodes disposed between each mirror 50 and the substrate 1, the elevated address electrode 32 has a second antireflection film 91 provided on a second incident end face 300 thereof, which is an end face 320 located in the one direction D1. In other words, the second antireflection film 91 is provided on the end face 320 of the elevated address electrode 32 located at the side from which the light L0 is radiated (second incident end face 300). The second antireflection film 91 is formed of a dielectric multilayer film, in which two types of layers having different refractive indices are alternately stacked, or an optical absorption film. In the present embodiment, the second antireflection film 91 is formed of a dielectric multilayer film.

Furthermore, in the electro-optical device 100 according to the present embodiment, among the electrodes disposed between each mirror 50 and the substrate 1, the hinge 35 and the hinge arms 36 and 37 also have end faces 350, 360, and 370 located in the one direction D1 that serve as second incident end faces 300 and on which the second antireflection film 91 is provided. More specifically, the second antireflection film 91 is also provided on the end faces 350, 360, and 370 of the hinge 35 and the hinge arms 36 and 37 located at the side from which the light L0 is radiated (second incident end faces 300).

Method for Manufacturing Electro-Optical Device

FIGS. 5 to 8 show sectional views illustrating the steps of an example of a method for manufacturing the electro-optical device 100 to which the invention is applied. The sectional views are taken along line A-A in FIGS. 2 and 3. The steps described below are performed by using a mother substrate larger than the substrate 1 of a single device. However, the substrate 1 will be described without consideration of the mother substrate and the size of a single device.

Figure 5:
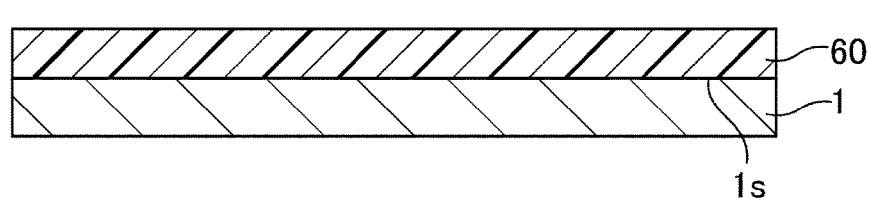
FIG. 5 shows sectional views illustrating steps of an example of a method for manufacturing an electro-optical device to which the invention is applied.
Figure 5:
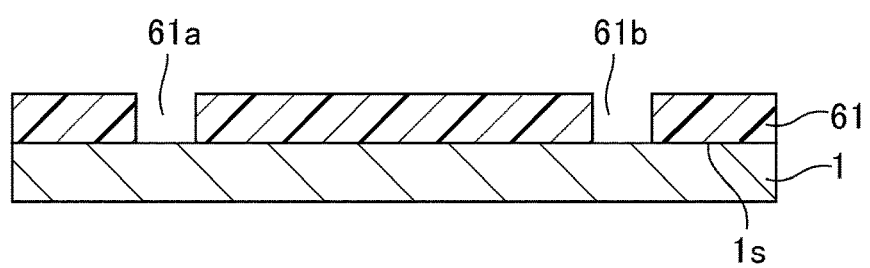
Figure 5:
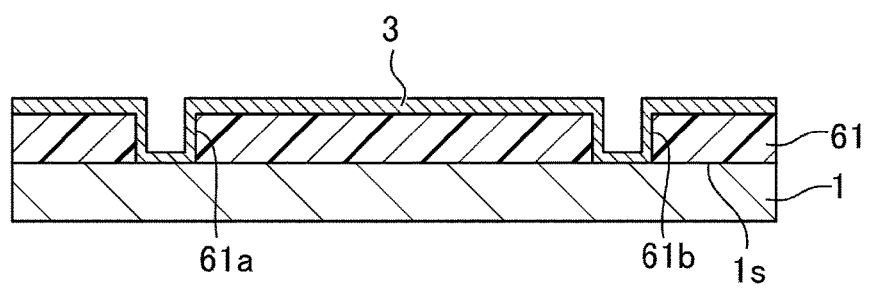
Figure 5:
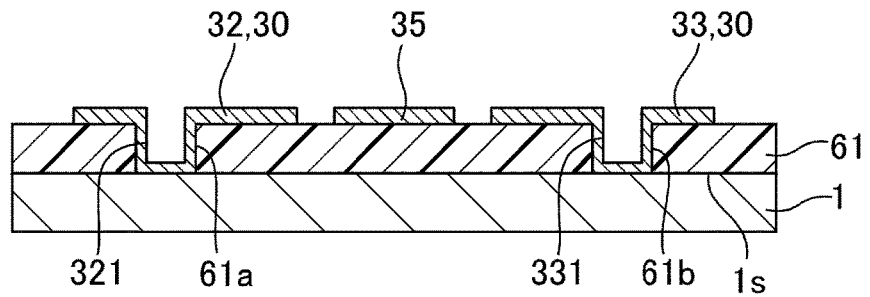

In step ST1 illustrated in FIG. 5, a first photosensitive resist layer 60 made of, for example, positive organic photoresist, is formed on the surface is of the substrate 1 on which the address circuit 14, the substrate bias electrode 11, and the substrate address electrodes 12 and 13 described above with reference to FIG. 2 are formed. Next, in step ST2 illustrated in FIG. 5, the first photosensitive resist layer 60 is exposed to light and developed to form a first sacrificial layer 61 having openings 61a and 61b in which the electrode posts 321 and 331 are to be formed. At this time, openings (not shown) in which the hinge posts 39 are to be formed are also formed.

Next, in step ST3 illustrated in FIG. 5, a first conductive film 3 is formed on the surface of the first sacrificial layer 61. The first conductive film 3 is formed of, for example, a single-layer film including an aluminum layer or a multi-layer film including an aluminum layer and a titanium layer. Next, in step ST4 illustrated in FIG. 5, the first conductive film 3 is patterned to form the elevated address electrodes 32 and 33 and the hinge 35. At this time, the electrode posts 321 and 331 are formed in the openings 61a and 61b. Although not illustrated, the hinge arms 36 and 37 are also formed.

Figure 6:
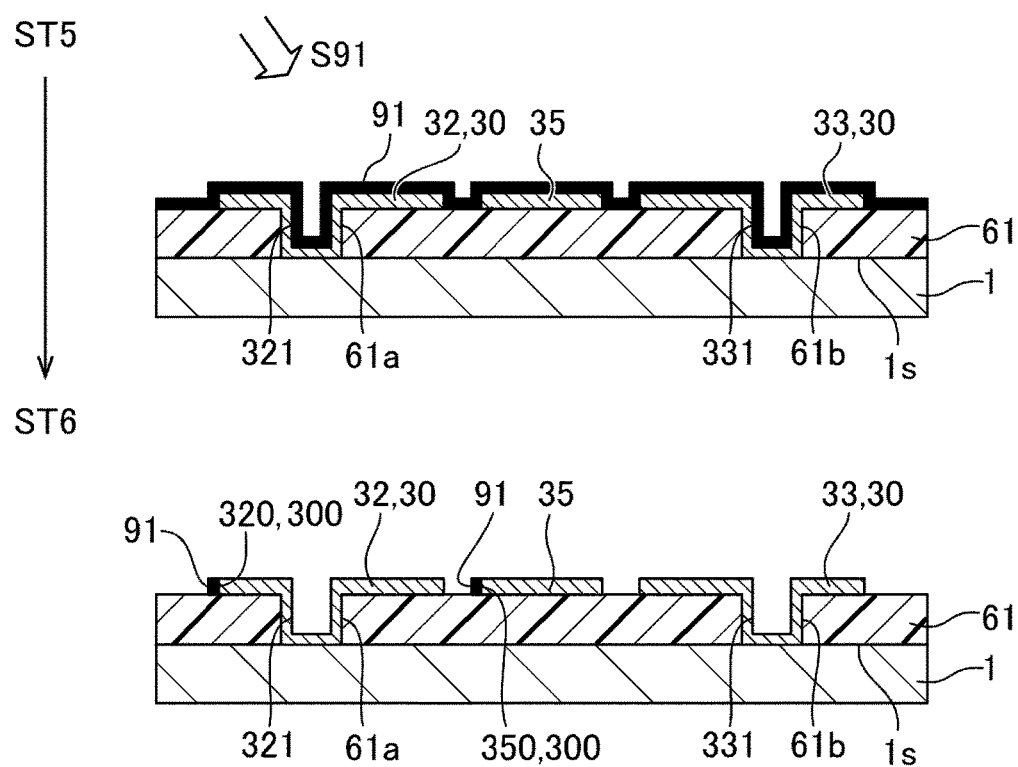
FIG. 6 shows sectional views illustrating steps of the example of the method for manufacturing the electro-optical device to which the invention is applied.

Next, in step ST5 illustrated in FIG. 6, the second antireflection film 91 is formed on the surfaces of the elevated address electrodes 32 and 33, the hinge 35, and other components. Next, in step ST6 illustrated in FIG. 6, the second antireflection film 91 is partially removed from the surfaces of the elevated address electrodes 32 and 33, the hinge 35, and other components so that the second antireflection film 91 remains on the second incident end faces 300, which are the end face 320 of the elevated address electrode 32 and the end face 350 of the hinge 35.

In step ST5 illustrated in FIG. 6, the second antireflection film 91 is formed by oblique deposition from the side at which the end face 320 of the elevated address electrode 32 and other end faces are located, as shown by the arrow S91. Therefore, the end face 320 of the elevated address electrode 32 and other end faces can be reliably covered with the second antireflection film 91. In addition, in step ST6 illustrated in FIG. 6, the second antireflection film 91 is partially removed by, for example, anisotropic dry etching in a state in which a resist or the like is applied. Therefore, the second antireflection film 91 reliably remains on the end face 320 of the elevated address electrode 32 and other end faces. Preferably, a planarizing film is formed so as to cover the second antireflection film 91 by using spin-on-glass (SOG) or a resist after the second antireflection film 91 is formed, and then anisotropic dry etching is performed on the surface of the planarizing film. In this case, when the etching rate for the planarizing film is higher than that for the second antireflection film 91, the second antireflection film 91 remains on the end face 320 of the elevated address electrode 32 and other end faces at the time when the second antireflection film 91 is removed from the surfaces of the elevated address electrode 32 and from the space between the elevated address electrode 32 and the hinge 35.

Figure 7:
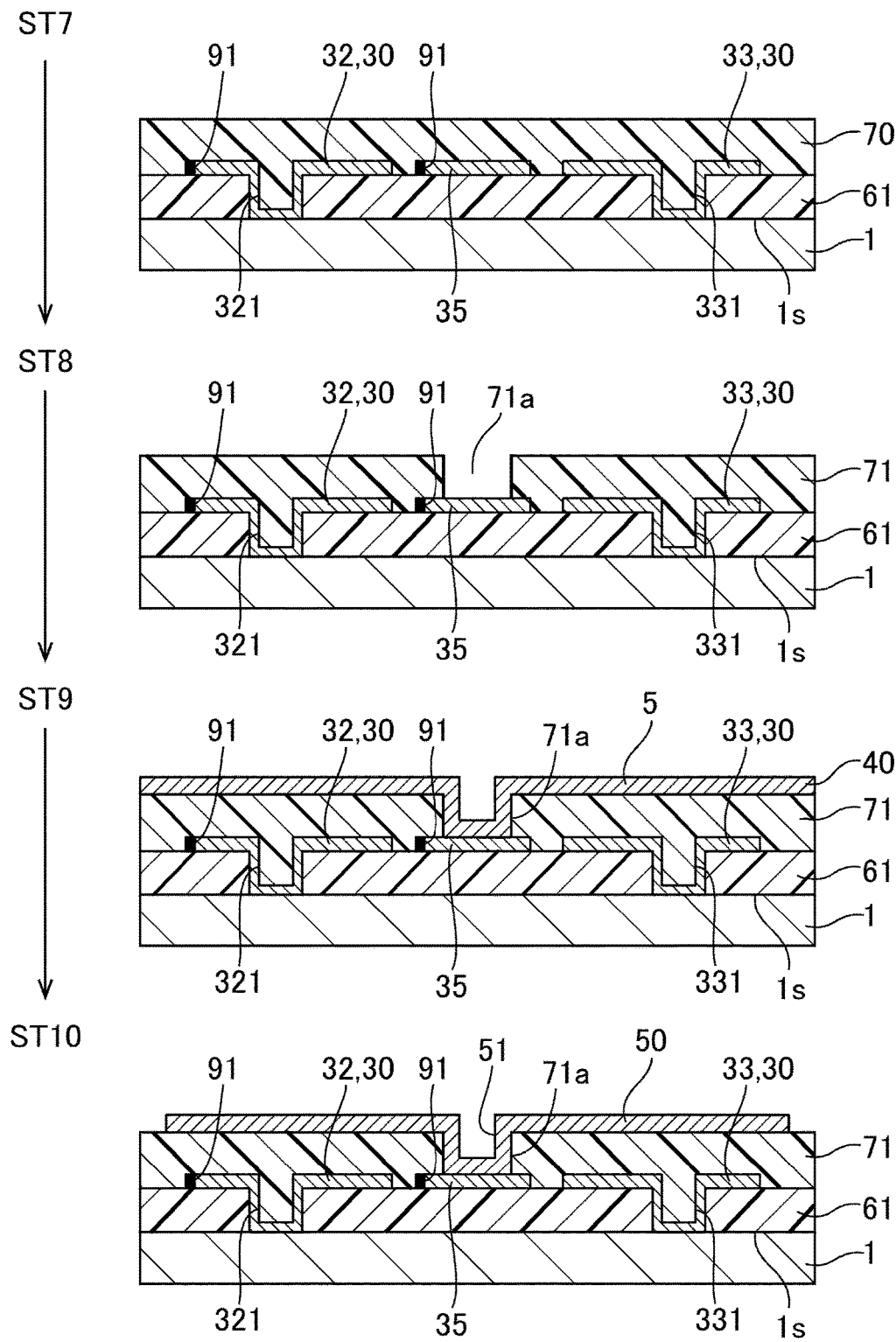
FIG. 7 shows sectional views illustrating steps of the example of the method for manufacturing the electro-optical device to which the invention is applied.

Next, in step ST7 illustrated in FIG. 7, a second photosensitive resist layer 70 made of a positive organic photoresist or the like is formed so as to cover the elevated address electrodes 32 and 33 and the hinge 35. Then, in step ST8 illustrated in FIG. 7, the second photosensitive resist layer 70 is exposed to light and developed to form a second sacrificial layer 71 including an opening 71a in which the mirror support post 51 is to be formed.

Next, in step ST9 illustrated in FIG. 7, a second conductive film 5 is formed on the surface of the second sacrificial layer 71 over the entire area thereof. The second conductive film 5 is an aluminum layer. Next, in step ST10 illustrated in FIG. 7, the second conductive film 5 is patterned to form the mirror 50. At this time, the mirror support post 51 is formed in the opening 71a. Also, the hole 55 that opens in the surface of the mirror 50 remains in the mirror support post 51.

Figure 8:
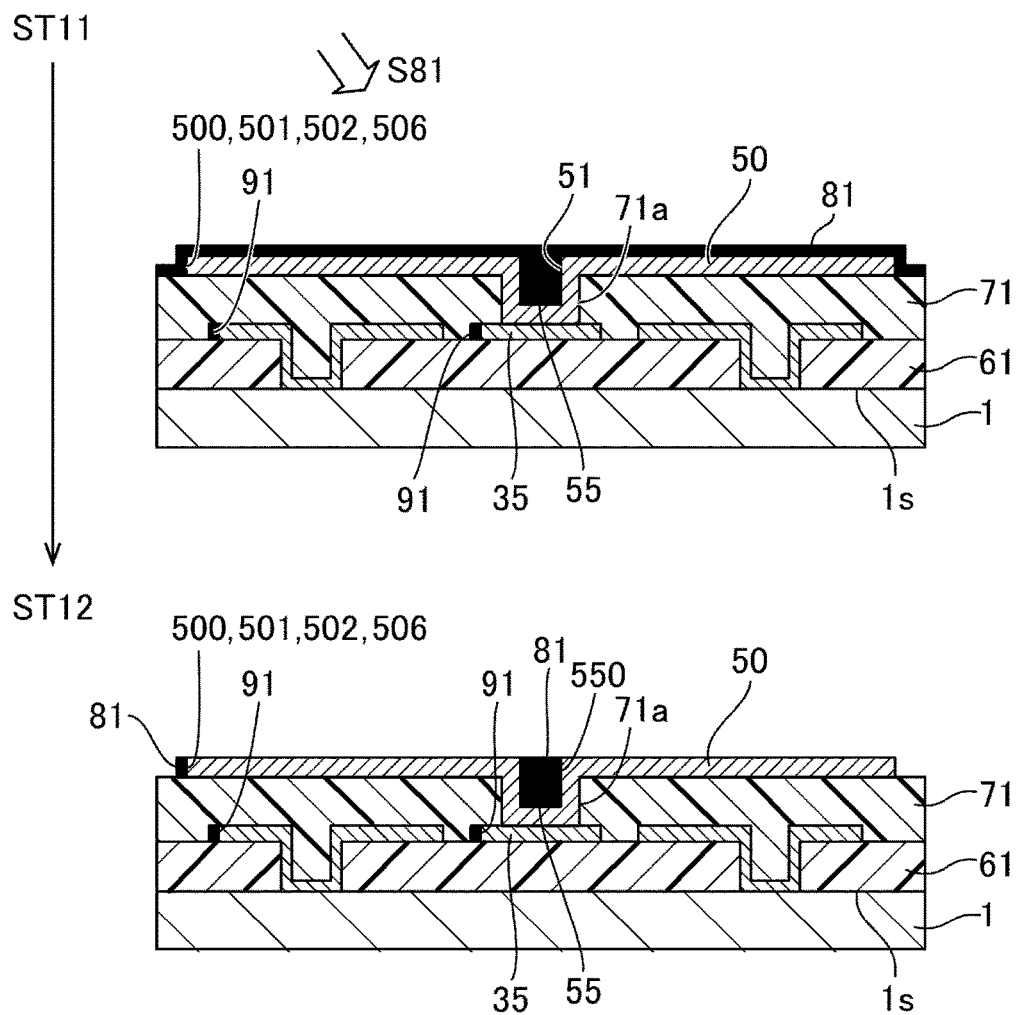
FIG. 8 shows sectional views illustrating steps of the example of the method for manufacturing the electro-optical device to which the invention is applied.

Next, in step ST11 illustrated in FIG. 8, the first antireflection film 81 is formed on the surface of the mirror 50. Then, in step ST12 illustrated in FIG. 8, the first antireflection film 81 is partially removed from the surface of the mirror 50 so that the first antireflection film 81 remains on the first incident end faces 500, which are the end faces 501 and 502 of the mirror 50. The first antireflection film 81 also remains on a part of the inner wall 550 of the hole 55, which opens in the surface of the mirror 50, the part of the inner wall 550 facing the side from which the light L0 is radiated. Depending on the size of the hole 55 and the thickness of the first antireflection film 81, the first antireflection film 81 may either be formed only on the part of the inner wall 550 or be formed so as to fill the hole 55. In the present embodiment, the hole 55 is filled with the first antireflection film 81.

In step ST11 illustrated in FIG. 8, the first antireflection film 81 is formed by oblique deposition from the side at which the end faces 501 and 502 of the mirror 50 are located, as shown by the arrow S81. Therefore, the end faces 501 and 502 of the mirror 50 can be reliably covered with the first antireflection film 81. In addition, in step ST12 illustrated in FIG. 8, the first antireflection film 81 is partially removed by, for example, anisotropic etching in a state in which a resist or the like is applied. Therefore, the first antireflection film 81 reliably remains on the end faces 501 and 502 of the mirror 50. Preferably, a planarizing film is formed so as to cover the first antireflection film 81 by using SOG or a resist after the first antireflection film 81 is formed, and then anisotropic dry etching is performed on the surface of the planarizing film. In this case, when the etching rate for the planarizing film is higher than that for the first antireflection film 81, the first antireflection film 81 remains on the end faces 501 and 502 of the mirror 50 at the time when the first antireflection film 81 is removed from the surface of the mirror 50 and from the spaces between the mirror 50 and the adjacent mirrors 50.

Next, the first sacrificial layer 61 and the second sacrificial layer 71 are removed by, for example, plasma etching. As a result, the electro-optical device 100 is obtained.

Main Advantages of Present Embodiment

As described above, in the electro-optical device 100 and the electronic device 1000 according to the present embodiment, when the light source 110 radiates the light L0 toward the mirror 50 in a direction at an angle with respect to the direction perpendicular to the mirror 50, the position of the mirror 50 is switched to the ON position or the OFF position. Since the first antireflection film 81 is disposed on the end faces 501 and 502 (first incident end faces 500) of the mirror 50 at the side from which the light L0 is radiated, reflection of the light L0 by the first incident end faces 500 is suppressed by the first antireflection film 81. Therefore, generation of stray light due to the reflection by the end faces 501 and 502 of the mirror 50 (unnecessary reflection of the light L0) can be suppressed. In particular, when the mirror 50 is at the OFF position, an end portion of the mirror 50 at the side from which the light L0 is radiated is raised high above the substrate 1. Although this leads to a risk that light reflected by the end faces 501 and 502 of the mirror 50 will be incident on the adjacent mirrors as stray light, such a risk is low in the present embodiment.

In the electro-optical device 100 and the electronic device 1000 according to the present embodiment, the hole 55 is formed in the surface of the mirror 50. However, the first antireflection film 81 is formed on the part of the inner wall 550 of the hole 55 that faces the side from which the light L0 is radiated. Therefore, reflection of the light L0 at the opening edge of the hole 55 can be suppressed, so that generation of stray light due to unnecessary reflection of the light L0 can be suppressed.

In the electro-optical device 100 and the electronic device 1000 according to the present embodiment, the second antireflection film 91 is disposed on the end face 320 (second incident end face 300) of the elevated address electrode 32 at the side from which the light L0 is radiated, the elevated address electrode 32 being disposed between the substrate 1 and the mirror 50. Therefore, reflection of the light L0 by the second incident end face 300 is suppressed by the second antireflection film 91. As a result, generation of stray light due to the reflection by the end face 320 of the elevated address electrode 32 (unnecessary reflection of the light L0) can be suppressed.

The first antireflection film 81 and the second antireflection film 91 are dielectric multilayer films, which cause interference between the incident light and the reflected light to reduce the amount of reflected light. Therefore, a temperature increase due to absorption of light is smaller than that in the case where optical absorption films are used. Accordingly, deformation of the mirror 50, the elevated address electrode 32, etc., due to the temperature increase caused by the absorption of light can be suppressed. In particular, in the present embodiment, the intensity of the light is high because the electronic device 1000 is a projection display device. However, the temperature increase due to the absorption of light can be suppressed in the present embodiment.

Another Structure of Electro-Optical Device 100

Figure 9:
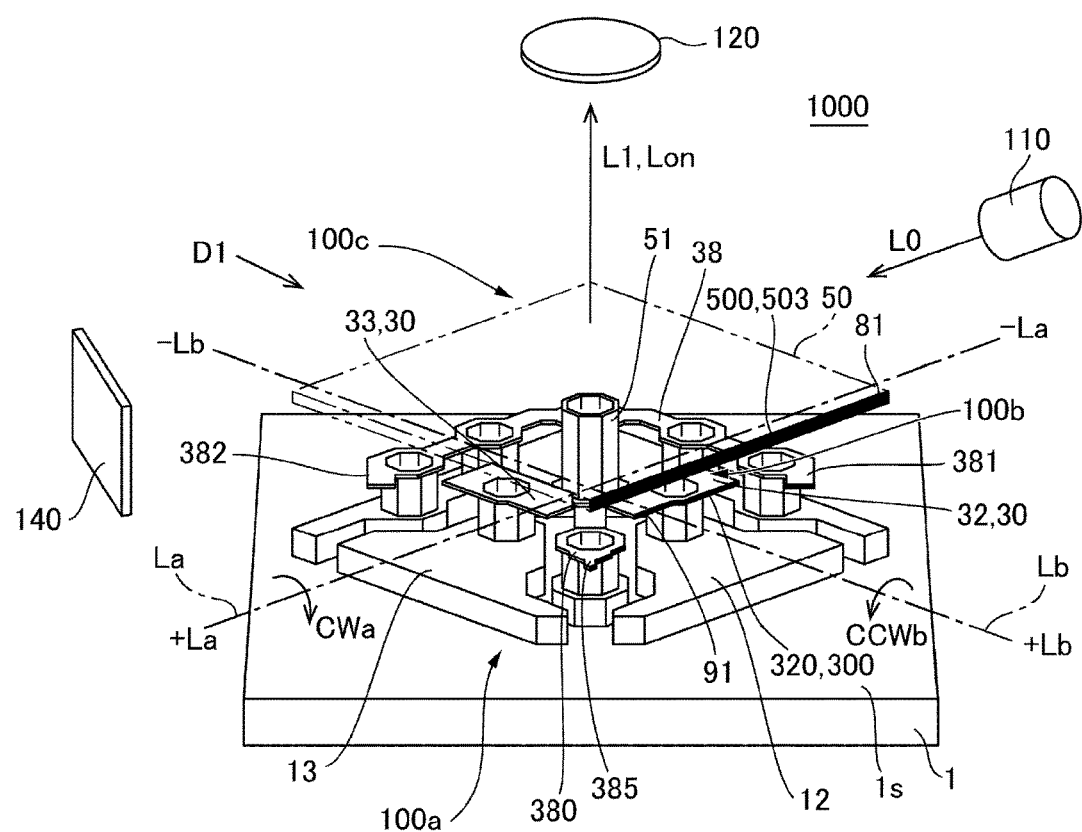
FIG. 9 illustrates another example of the structure of an electro-optical device to which the invention is applied.

FIG. 9 illustrates another example of the structure of the electro-optical device 100 to which the invention is applied. In FIG. 9, a mirror 50 in the steady position is shown by the two-dot chain lines. The basic structure of the present embodiment is similar to that described above with reference to FIG. 2 and other drawings. Thus, components that are the same as those of the structure illustrated in FIG. 2 are denoted by the same reference numerals, and description thereof is thus omitted.

In the electro-optical device 100 described with reference to FIG. 2 and other drawings, each mirror 50 is rotated around a single axis L. However, in the present embodiment, the mirror 50 is rotatable around a first axis La and a second axis Lb that cross each other. As described below, the mirror 50 is rotated around the first axis La in one direction CWa to the ON position, and around the second axis Lb in one direction CCWb to the OFF position.

More specifically, similar to the electro-optical device 100 illustrated in FIGS. 2 and 3, the electro-optical device 100 illustrated in FIG. 9 includes a first-level portion 100a including substrate address electrodes 12 and 13 formed on the surface is of the substrate 1; a second-level portion 100b including the elevated address electrodes 32 and 33 (driving element 30) and a cantilever hinge (not shown); and a third-level portion 100c including the mirror 50. The second-level portion 100b also includes a mirror support post 51 that connects an end portion of the cantilever hinge to the mirror 50 and a hinge spring 38 that is electrically connected to the hinge. The hinge spring 38 includes stoppers 381 and 382 that come into contact with the mirror 50 when the mirror 50 is tilted. The second-level portion 100b also includes an electrode 380 that is electrically connected to the hinge spring 38, and the electrode 380 also has a stopper 385.

The elevated address electrodes 32 and 33 are disposed on both sides of an end portion of the hinge so as to form a right angle. Accordingly, when an electrostatic force is generated between the elevated address electrode 32 and the mirror 50 or between the elevated address electrode 33 and the mirror 50, the hinge is turned so that the mirror 50 is tilted around the first axis La in the one direction CWa to the ON position, or around the second axis Lb in the one direction CCWb to the OFF position. When the application of the driving voltage to the elevated address electrodes 32 and 33 is stopped and the attractive force applied to the mirror 50 is eliminated, the hinge 35 exerts force for returning the mirror 50 to the position at which the mirror 50 is parallel to the substrate 1 (steady position). Here, the first axis La is parallel to the mirror 50 in the steady position, and the second axis Lb is parallel to the mirror 50 and crosses the first axis La.

Also in the present embodiment, the projection optical system 120 is located in the direction perpendicular to the mirror 50 in the steady position, and the ON direction Lon is the direction toward the projection optical system 120. The light source 110 radiates the light L0 toward the mirror 50 in a direction that is tilted from the ON direction Lon toward one side +Lb in the direction in which the second axis Lb extends. Therefore, when the driving element 30 switches the mirror 50 from the steady position to the ON position at which the mirror 50 is tilted around the first axis La in the one direction CWa, the mirror 50 reflects the light L0 in the ON direction Lon toward the projection optical system 120. When the driving element 30 switches the mirror 50 from the steady position to the OFF position at which the mirror 50 is tilted around the second axis Lb in the one direction CCWb, the mirror 50 reflects the light L0 in the OFF direction Loff toward the optical absorption device 140.

In the electro-optical device 100 having the above-described structure, one end face 503 of the mirror 50 faces the one direction D1, and the first antireflection film 81 is formed on this end face 503 (first incident end face 500). More specifically, one end face 503 (first incident end face 500) of the mirror 50 is located at the side from which the light L0 is radiated, and the first antireflection film 81 is provided on this end face 503 (first incident end face 500). The first antireflection film 81 is formed of a dielectric multilayer film or an optical absorption film. In the present embodiment, the first antireflection film 81 is formed of a dielectric multilayer film.

In addition, in the electro-optical device 100 according to the present embodiment, an end face 320 of the elevated address electrode 32 faces the one direction D1, and the second antireflection film 91 is formed on this end face 320 (second incident end face 300). More specifically, the end face 320 (second incident end face 300) of the elevated address electrode 32 is located at the side from which the light L0 is radiated, and the second antireflection film 91 is disposed on this end face 320 (second incident end face 300). The second antireflection film 91 is formed of a dielectric multilayer film or an optical absorption film. In the present embodiment, the second antireflection film 91 is formed of a dielectric multilayer film.

Also in this structure, reflection by the end face 503 (first incident end face 500) of the mirror 50 and the end face 320 (second incident end face 300) of the elevated address electrode 32 can be suppressed by the first antireflection film 81 and the second antireflection film 91. Therefore, generation of stray light can be suppressed.

Other Embodiments

In the above-described embodiments, the first antireflection film 81 and the second antireflection film 91 are formed of dielectric multilayer films. However, optical absorption films made of titanium (Ti), tungsten (W), or a metal compound thereof may instead be used.

In the above-described embodiments, red light, green light, and blue light are successively emitted from the light source 110 and successively optically modulated by the electro-optical device 100. However, red light, green light, and blue light may instead be simultaneously emitted from the light source 110 and respectively optically modulated by red light, green light, and blue light electro-optical devices. In this case, a combining optical system is provided to combine the modulated light emitted from the electro-optical devices 100, and the combined light is projected by the projection optical system.

In the above-described embodiments, the first antireflection film 81 is provided only on the end faces 501, 502, and 503 of the mirror 50. However, the first antireflection film 81 may instead be provided every end face of the mirror 50. Also, in the above-described embodiments, the second antireflection film 91 is provided only on the end face 320 of the elevated address electrode 32. However, the second antireflection film 91 may instead be provided on every end face of the elevated address electrode 32. In addition, in the above-described embodiments, the second antireflection film 91 is provided only on some of the electrodes disposed between the substrate 1 and the mirror 50. However, the second antireflection film 91 may instead be provided on all of the electrodes.

The entire disclosures of Japan Patent Application No.: 2016-128515, filed Jun. 29, 2016 is expressly incorporated by reference herein.

What is claimed is:

1. An electronic device comprising:
an electro-optical device including:
  a substrate,
  a mirror for optical modulation disposed above one surface side of the substrate, and
  an electrode disposed between the mirror and the substrate, the electrode generating an electrostatic force between the mirror and the electrode so as to rotate the mirror; and
a light source that radiates a light toward the mirror in an oblique direction with respect to a normal direction of the mirror, wherein
viewed from the normal direction, the mirror includes a plurality of end faces provided at an outer perimeter of the mirror, the plurality of end faces including:
  (i) a first end face including two adjacent end faces of the mirror with only one corner of the mirror disposed between the two adjacent end faces, the first end face being an end face towards which the light is radiated; and
  (ii) a second end face that is adjacent to the first end face, and including two adjacent end faces of the mirror with only one corner of the mirror disposed between the two adjacent end faces, and
a first antireflection film is provided on the first end face, such that the first antireflection film is provided on the two adjacent end faces of the first end face, and is not provided on the two adjacent end faces of the second end face.

2. The electronic device according to claim 1, wherein the mirror includes a protruding portion that protrudes toward the substrate, and the protruding portion includes a hole that opens in a surface of the mirror, and
wherein the hole includes an inner wall, and the first antireflection film is provided on a part of the inner wall that faces a side towards which the light is radiated.

3. The electronic device according to claim 1, wherein the electrode includes a third end face which is an end face located at a side of the electrode towards which the light is radiated, and a second antireflection film is provided on the third end face.

4. The electronic device according to claim 3, wherein the first antireflection film and the second antireflection film are dielectric multilayer films.

5. The electronic device according to claim 1, wherein the first antireflection film is a dielectric multilayer film.

6. The electronic device according to claim 1, further comprising:
a projection optical system that projects a reflected light that is reflected by the mirror.

7. An electro-optical device comprising:
a substrate;
a mirror for optical modulation disposed above one surface side of the substrate; and an electrode disposed between the mirror and the substrate, the electrode generating an electrostatic force between the mirror and the electrode so as to rotate the mirror, wherein viewed from a normal direction of the mirror, the mirror includes a plurality of end faces provided at an outer perimeter of the mirror, the plurality of end faces including:
(i) a first end face including two adjacent end faces of the mirror with only one corner of the mirror disposed between the two adjacent end faces, the first end face being an end face at a side from which light is radiated; and
(ii) a second end face that is adjacent to the first end face, and including two adjacent end faces of the mirror with only one corner of the mirror disposed between the two adjacent end faces, and a first antireflection film is provided on the first end face, such that the first antireflection film is provided on the two adjacent end faces of the first end face, and is not provided on the two adjacent end faces of the second end face.

8. The electro-optical device according to claim 7, wherein the mirror includes a protruding portion that protrudes toward the substrate, and the protruding portion includes a hole that opens in a surface of the mirror, and
wherein the hole includes an inner wall, and the first antireflection film is provided on a part of the inner wall that faces the one direction.

9. The electro-optical device according to claim 7, wherein the electrode includes a third end face which is an end face of the electrode located in the one direction, and a second antireflection film is provided on the third end face.

* * * * *